United States Patent [19]

Splittstoesser et al.

[11] Patent Number: 5,496,226
[45] Date of Patent: Mar. 5, 1996

[54] FRICTION DRIVE UNIT FOR RIDING LAWN MOWERS AND THE LIKE

[75] Inventors: Clair D. Splittstoesser; Donald P. Crosby; David G. Park; Larry S. Funk, all of Coffeyville, Kans.

[73] Assignee: Dixon Industries, Inc., Coffeyville, Kans.

[21] Appl. No.: 243,966

[22] Filed: May 17, 1994

[51] Int. Cl.[6] .......................... F16H 15/20; B62D 11/12
[52] U.S. Cl. ................................ 476/24; 74/721; 180/6.2; 180/6.66; 476/56
[58] Field of Search ..................... 74/721; 180/6.2, 180/6.66; 476/24, 56

[56] References Cited

U.S. PATENT DOCUMENTS

| | | | |
|---|---|---|---|
| 3,306,132 | 2/1967 | Davis | 74/721 |
| 3,410,156 | 11/1968 | Davis | 74/721 |
| 3,448,818 | 6/1969 | Davis | 74/721 X |
| 3,479,891 | 11/1969 | Moore | 476/24 |
| 3,570,316 | 3/1971 | Hornack et al. | 476/24 |
| 3,738,186 | 6/1973 | Deese | 476/24 X |
| 4,625,586 | 12/1986 | Splittstoesser | 476/58 X |

*Primary Examiner*—Allan D. Herrmann
*Attorney, Agent, or Firm*—Hovey, Williams, Timmons, & Collins

[57] ABSTRACT

A variable speed friction drive apparatus for a lawn mower includes a pair of drive cones supported by a frame for rotational movement about a common first axis, and a pair of drums supported by carriages for rotation about axes transverse to the lengths of the carriages. Each carriage is supported on the frame for movement between a neutral position in which the associated drum is disengaged from either of the cones and a plurality of driving positions in which the drum engages either of the cones. A universal joint connects the rear end of each carriage to the frame for universal pivotal movement about the joint, and both ends of each carriage are independently biased toward the neutral position.

17 Claims, 5 Drawing Sheets

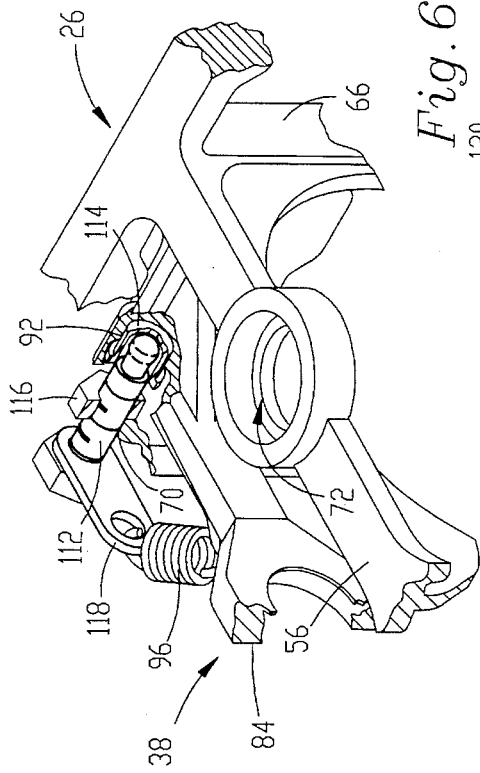
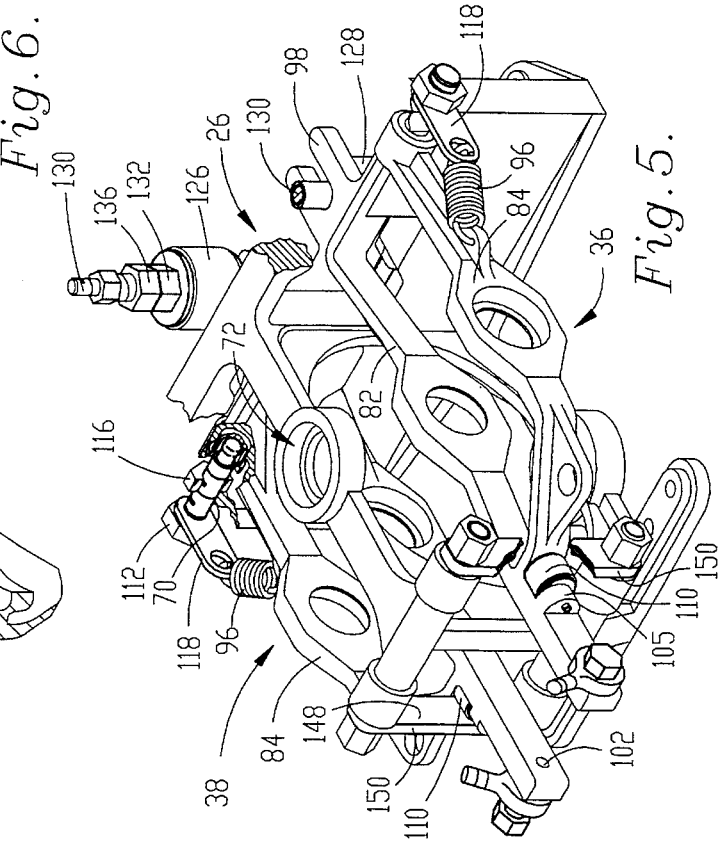
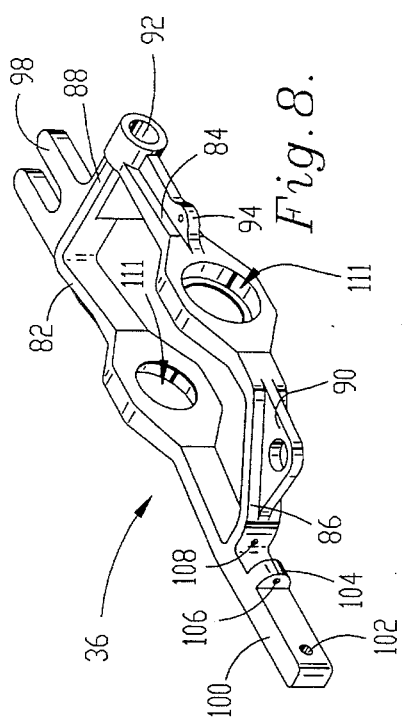
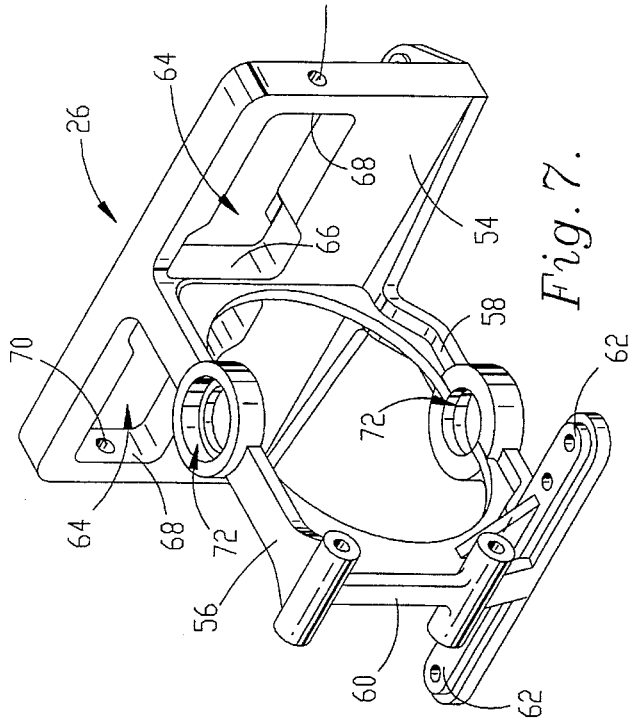

ically, two drums are provided, each supported on its own carriage,

FRICTION DRIVE UNIT FOR RIDING LAWN MOWERS AND THE LIKE

BACKGROUND OF THE INVENTION

1. Field of the Invention

The present invention relates generally to transmissions, and more particularly to a variable speed friction drive unit for riding lawn mowers and the like.

2. Discussion of the Prior Art

It is known to provide a lawn mower having two drive wheels, with an independent transmission and speed control for each drive wheel. In these known constructions, a variable speed transmission serves as the clutch, differential, and means for braking. In addition, two hand levers are provided for independently controlling the drive wheels. Such a known construction eliminates the need for a steering wheel, clutch pedal or gearshift, simplifying operation of the mower while increasing maneuverability.

An example of such a mower construction is shown in U.S. Pat. No. 4,625,586, assigned of record to the assignee of the present application. The disclosure of the '586 patent is hereby incorporated in this application by express reference.

In the '586 patent, a drive unit is described which includes a pair of driving cones on a powered input shaft, and a pair of driven drums on separate output shafts mounted on independent subframes or carriages. The carriages are rockable in a frame such that each drum can engage the cone for power transmission to the corresponding drive wheel at a speed ratio dependent on the point of contact of the drum on the cone. A resilient rod connected between each carriage and the frame urges the drum toward the neutral, disengaged positions, and these rods cause the drums to contact the drive cones with sufficient force to provide torque for operation of the machine.

Although the resilient rods provide satisfactory operation of the drive unit, it would be desirable to improve the responsiveness of the unit to actuation of the hand levers, and to provide greater driving torque to the wheels without requiring the operator to substantially increase operating pressure on the hand levers. By enabling this type of adjustment of the unit, it is possible to insure that the transmission engages immediately upon actuation of the hand levers, and delivers an initial driving force of a magnitude sufficient to start the mower moving smoothly.

OBJECTS AND SUMMARY OF THE INVENTION

It is an object of the present invention to provide a variable speed friction drive apparatus which overcomes the shortcomings in conventional constructions in order to provide crisp, responsive transmission of driving power to the wheels when the hand levers are operated. In addition, it is an object of the present construction to permit easy and accurate adjustment in the initial point of contact between the drums and the drive cones so that it is possible to alter the speed of the transmission.

The present invention also provides a means by which the output torque of the transmission may be easily adjusted, wherein when the output torque is increased, the input force required to actuate the hand levers is not substantially increased.

These objects of the invention permit a pair of side-by-side drums to be matched with one another so that when the two hand levers are moved forward or backward together, the torque delivered to each of the drive wheels of the mower is substantially the same. Such results are difficult to achieve with conventional constructions.

It is another object of the invention to provide an apparatus having a simple means of engaging the drive, without presenting numerous mechanical components that would otherwise introduce free play into the actuation of the transmission and reduce the responsiveness of the transmission to hand lever movements.

In accordance with these and other objects evident from the following description of a preferred embodiment, a variable speed friction drive apparatus is provided which includes a pair of drive cones supported by a frame, and a drum supported by an elongated carriage. The drive cones are rotatable about a common first axis, and the drum is rotatable about a second axis extending in a direction transverse to the length of the carriage. The carriage is supported relative to the frame for movement between a neutral position in which the drum is disengaged from either of the cones and a plurality of driving positions in which the drum engages either of the cones.

The support means employed in the apparatus includes a universal joint for connecting the first end of the carriage to the frame for universal pivotal movement about the joint, a first biasing means for biasing the first end of the carriage toward the neutral position, and a second biasing means for biasing the second end of the carriage toward the neutral position. In addition, a drive engaging means is connected to the second end of the carriage for moving the carriage against the forces exerted by the first and second biasing means between the neutral and driving positions. Typically, two drums are provided, each supported on its own carriage, and separate carriage support means and drive engaging means are provided in association with the second carriage.

Preferably, the support means includes a lateral positioning means for maintaining the lateral position of the carriage relative to the frame during movement of the carriage, and the positioning means includes a bearing surface defined in a plane parallel to the first axis, and a biasing means for biasing the carriage against the bearing surface in a direction transverse to the first axis away from the cones.

The drive engaging means preferably includes an input member supported relative to the carriage for rotation about an axis parallel to the second axis, a force transmitting member connected between the input member and the second end of the carriage for moving the carriage between the neutral and driving positions when the input member is rotated, and a hand lever for rotating the input member.

Also, it is desirable to form the frame of a unitary piece of material including an upright wall and a pair of spaced elongated beams extending outward from the wall, wherein the elongated beams are formed with cone support means for supporting the drive cones and defining the location of the first axis relative to the frame, and the rear wall is formed with a connection point for receiving and supporting the universal joint. Thus, the cone support means and universal joint are spaced from one another by a distance which is fixed during formation of the unitary frame, and construction of the apparatus is simplified while providing for very accurate placement of the carriage on the frame.

By providing a variable speed friction drive unit in accordance with the present invention, numerous advantages are realized. For example, by permitting accurate positioning of the carriages relative to the frame the neutral positions of the two drums typically employed can be matched to each other so that the drums engage the drive cones at substantially the same point when the hand levers are moved together. Further, the output torque of the carriages may be adjusted to a desired level. Thus, the response obtained from each lever is consistent with that of the other lever, and both engage at the same speed and deliver the same torque so that the lawn mower is easy to operate.

Further, by providing a drive engaging means as provided for in the present invention, excess play is removed from the unit, providing a crisp feel to an operator handling the levers, and delivering responsive drive to the lawn mower. The drive engaging means is also less complex than conventional systems, and is easier to assemble during manufacture. The same is true for the frame and carriage support means, in that a simplified construction results in a high quality, reproducible unit.

BRIEF DESCRIPTION OF THE DRAWING FIGURES

A preferred embodiment of the present invention is described in detail below with reference to the attached drawing figures, wherein:

FIG. 5 is a fragmentary perspective view of a frame and carriages of the drive unit, illustrating various features of the means supporting the carriages on the frame;

FIG. 6 is an enlarged fragmentary perspective view of a universal joint between one of the carriages and the frame;

FIG. 7 is a perspective view of the frame;

FIG. 8 is a perspective view of one of the carriages;

FIG. 9 is an enlarged fragmentary side elevational view of the lawn mower, illustrating the carriage support means between one of the carriages and the frame;

DETAILED DESCRIPTION OF THE PREFERRED EMBODIMENT

Figure 1:
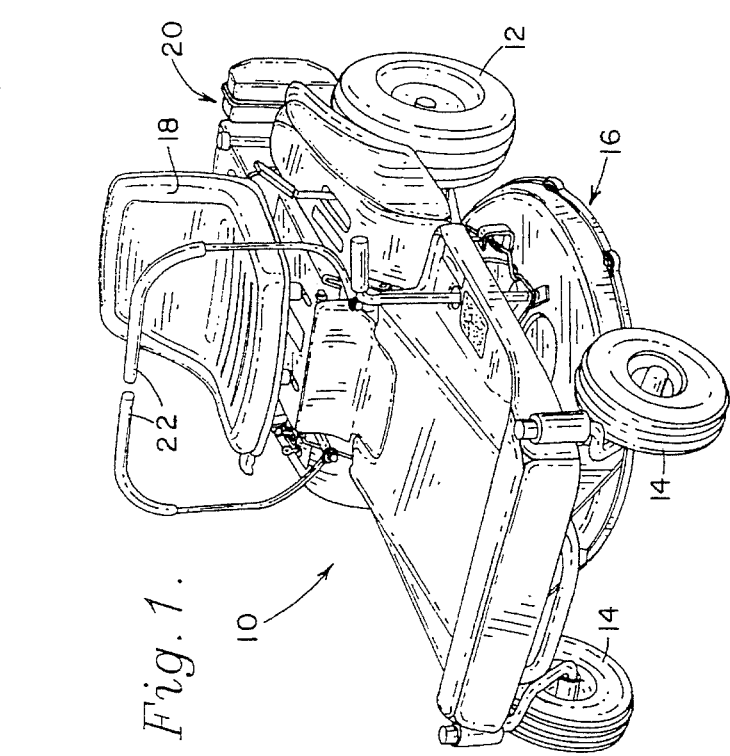
FIG. 1 is a perspective view of a lawn mower assembled with a variable speed friction drive unit constructed in accordance with a preferred embodiment of the present invention.

A lawn mower 10 assembled with a variable speed friction drive unit constructed in accordance with a preferred embodiment of the present invention is shown in FIG. 1, and includes two pairs of ground engaging wheels 12, 14, a mower assembly 16 suspended from the lawn mower between the front and rear wheels, a seat 18 for the operator, an engine 20, and a pair of hand levers 22 for operating the transmission drive between the engine and the rear wheels 12. Although the drive unit is illustrated in a lawn mower, it could also be employed in other implements, such as in floor cleaning equipment, novelty vehicles, utility vehicles and the like.

The front wheels 14 of the lawn mower are not driven, but simply support the mower above the ground, while the rear wheels are connected to the engine through the transmission drive. No steering wheel is provided since control of the direction of the lawn mower is achieved by independently controlling the direction and speed of rotation of the rear wheels via the hand levers.

Figure 2:
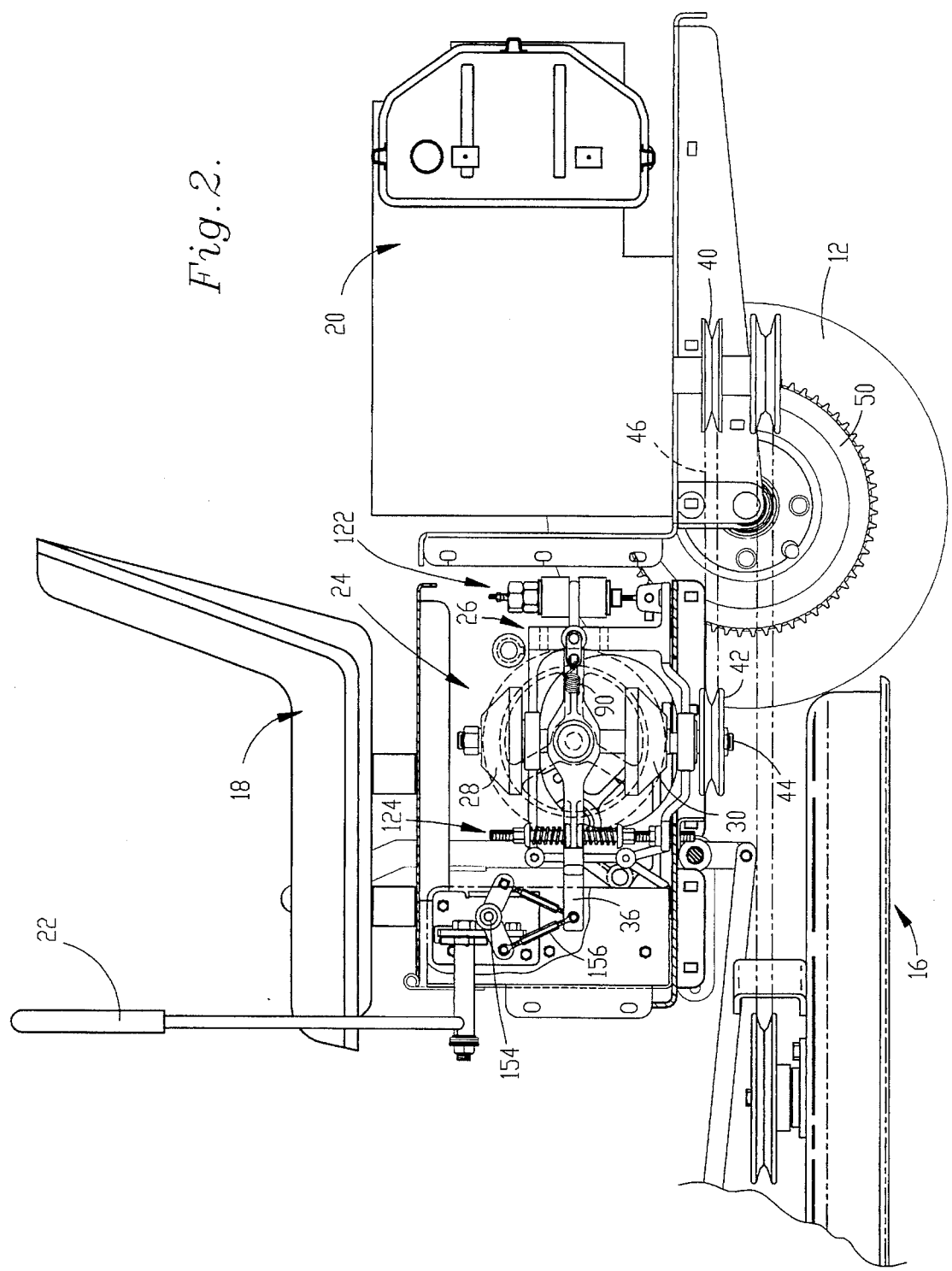
FIG. 2 is a fragmentary side elevational view of the lawn mower, illustrating the drive unit.

As illustrated in FIG. 2, the transmission drive of the lawn mower includes a variable speed friction drive unit 24 mounted beneath the seat and forward of the engine. The drive unit broadly includes a frame 26, a pair of drive cones 28, 30 supported by the frame for rotation about a vertical axis, and a pair of laterally spaced drums 32, 34, shown in FIG. 4, operatively connected to the rear wheels of the lawn mower and supported on carriages 36, 38 that are movable relative to the frame between a neutral position in which the drums are disengaged from the cones and a plurality of driving positions in which the drums engage the cones.

Figure 4:
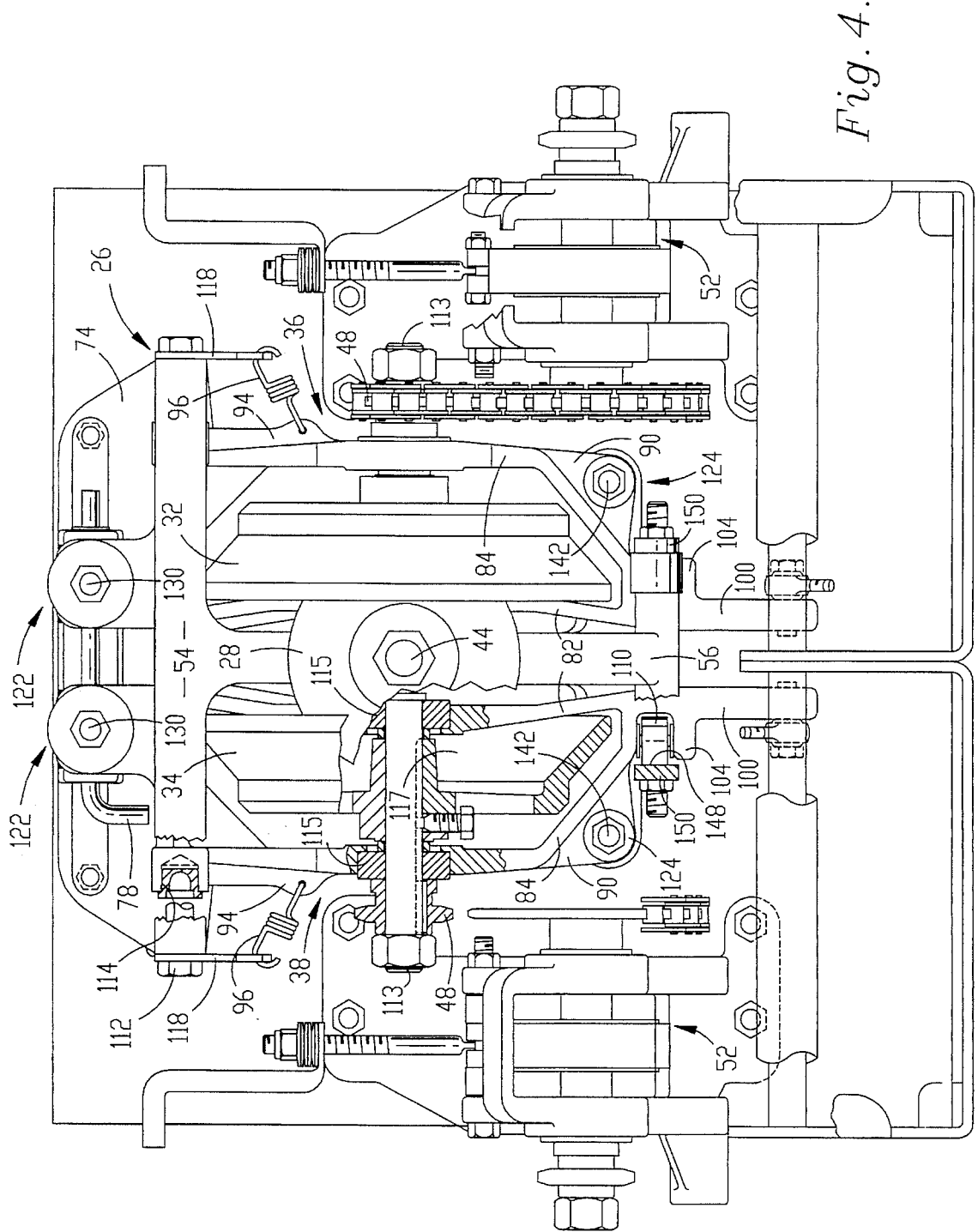
FIG. 4 is a top plan view, partially in section, of the drive unit, illustrating the drive unit in place in the lawn mower.

Returning to FIG. 2, power from the engine is fed to the drive unit by a belt and pulley system including a first pulley 40 connected to the output shaft of the engine, a second pulley 42 connected to a drive shaft 44 of the drive unit, and a belt 46, shown in phantom lines, extending around the first and second pulleys 40, 42. As shown in FIG. 4, power is delivered by the drive unit to the rear wheels of the lawn mower by a chain and sprocket system including a first sprocket 48 supported for rotation with each drum, a second sprocket 50 mounted on each wheel, illustrated in FIG. 2, and chains connected between the first and second sprockets on each side of the lawn mower through a suitable brake assembly 52, as shown in FIG. 4.

Figure 3:
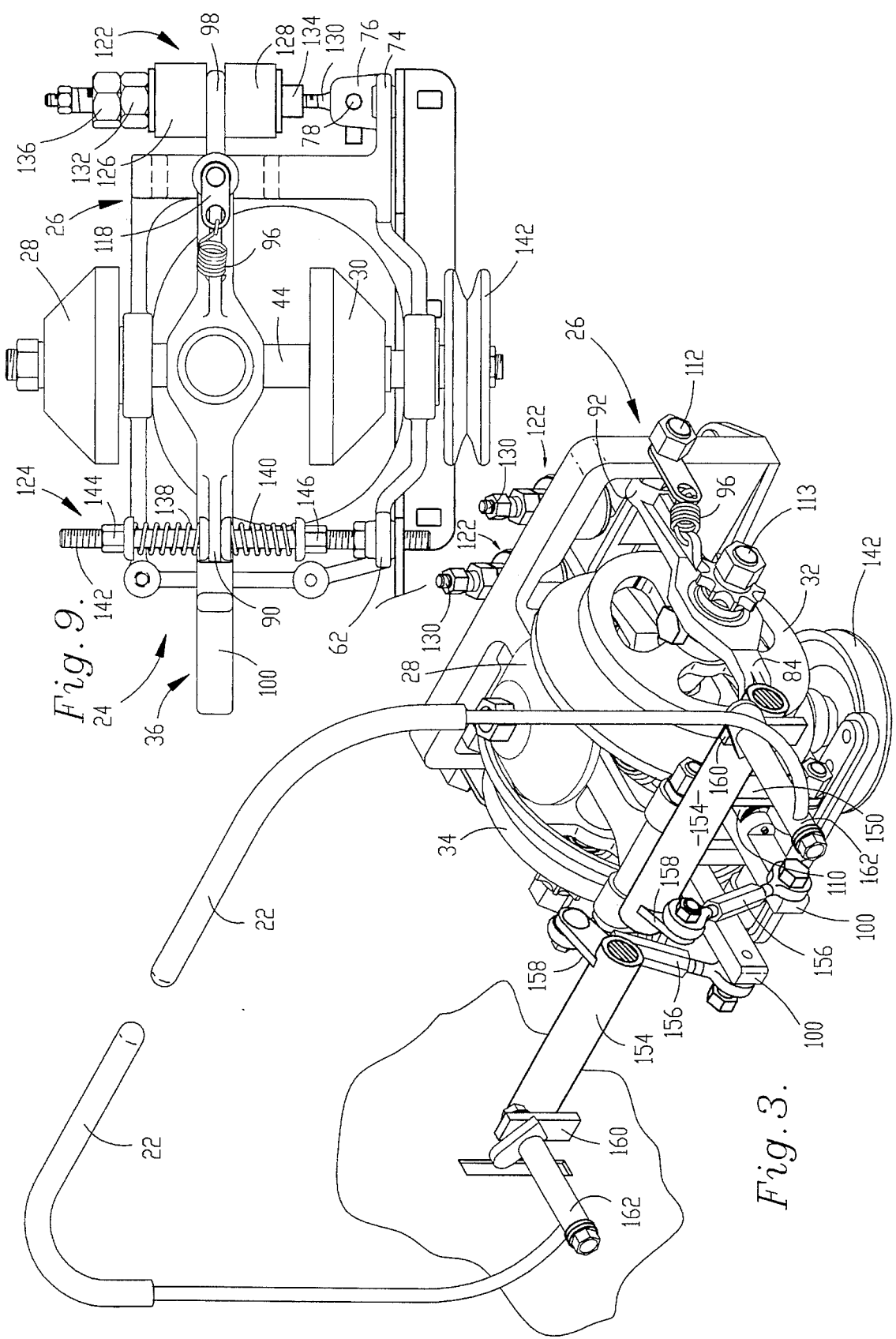
FIG. 3 is a perspective view of the drive unit, illustrating the drive unit removed from the lawn mower.

The drive unit 24 is shown removed from the lawn mower in FIG. 3, and further includes a carriage support means for supporting each carriage 36, 38 relative to the frame 26, and a drive engaging means connected to an end of each carriage for moving the carriage between the neutral and driving positions.

The frame 26 is illustrated in FIG. 7, and includes a unitary piece of metal or other suitable material that is cast in the desired shape and then machine finished. The frame includes an upright rear wall 54 and a pair of vertically spaced elongated beams 56, 58 extending outward from the upper and lower edges of the rear wall. The distal ends of the beams are connected together by a column 60, and a pair of opposing feet 62 extend laterally outward from each side of the column in a direction generally parallel to the rear wall.

The rear wall is formed with a pair of cutout areas 64, each of which is a mirror image of the other, and the areas are positioned on opposite sides of the beams from one another. The cutout areas 64 each include an inboard section 66 and an outboard section 68, wherein the inboard sections have a greater height than the outboard sections. A horizontally extending bore 70 extends through the side edge of the rear wall into the outboard section 68 of each cutout area, and these bores 70 define the connection points between the frame 26 and the carriages.

Each of the beams 56, 58 are formed with cone support means for supporting the drive cones and defining the location of the axis about which the cones rotate relative to the frame. Preferably, the cone support means includes circular openings 72 in the beams which are aligned vertically with each other and sized to define bearing seats. In this manner, as shown in FIG. 9, the shaft 44 and drive cones 28, 30 are supported by the beams in suitable bearing assemblies, and are accurately positioned relative to the frame. Returning to FIG. 7, because the two bearing seats 72 and the bores 70 on the rear wall are all formed in the unitary frame, the spacing between each of the connection points and the drive cones is accurately established, and is consistent from one side of the frame to the other.

As shown in FIG. 9, a base 74 extends outward from the bottom edge of the rear wall of the frame, and is formed with upstanding lugs 76 adapted to receive an L-shaped pin 78 of the carriage support means. The base also includes openings, shown in FIG. 10, through which bolts 80 may be passed to attach the frame to the chassis of the lawn mower during assembly. Similar openings are provided in each of the feet 62, as shown in FIG. 7.

Turning to FIG. 8, the carriage 36 is shown removed from the apparatus. Because the carriages 36, 38 are mirror images of one another, reference to the structure of the carriage 36 will apply equally to both, except that the inboard and outboard sides of the carriage 36 are reversed relative to the carriage 38.

The carriage 36 is formed of a unitary piece of metal or other suitable material, and is generally rectangular in shape, presenting a pair of elongated, parallel inboard and outboard side arms 82, 84 that are spaced from one another by front and rear cross pieces 86, 88. The front cross piece 86 presents an outboard lug 90 adapted to receive a biasing assembly of the carriage support means. A tap 92 is provided in the outboard end of the rear cross piece 88, and defines the connection point on the carriage at which the carriage is supported by the frame. A gusset extends between the outboard arm and the rear cross piece for strengthening the rear outboard corner of the carriage adjacent the tap. Also, a small lug 94 extends outward from the outboard side arm 84 at a position forward of the tap 92, and defines an eye through which a coil tension spring 96 is connected between the carriage and the frame, as shown in FIG. 5.

A pair of longitudinally extending fingers 98 extend longitudinally outward from the rear inboard corner of the carriage. As described below, the fingers 98 are sized to cooperate with the support means.

An extension 100 of the inboard side arm 82 of the carriage extends beyond the front cross piece 86, and includes a transverse hole 102 through which the extension is connected to the drive engaging means. Also, the extension includes a small lug 104 on the outboard side thereof, and a pair of holes 106, 108, one extending through the lug and the other extending into the front cross piece. The holes 106, 108 are collinear, and support a bearing roller 110, shown in FIG. 5.

The inboard and outboard side arms 82, 84 are each provided with an opening 111, and these openings are collinear with one another to define bearing seats within which a shaft 113 is supported, as shown in FIG. 4, by suitable bearing assemblies 115. The drum 32 is secured to the shaft 113 for rotation relative to the carriage, as is the sprocket 48 used to transmit driving force to one of the rear wheels. Both drums 32, 34 are connected to the carriages 36, 38 in this fashion.

Each drum includes a hub that is secured to the shaft 113, and a generally conical rim which opens inward toward the cones to define a contact surface 117 adapted to engage either of the cones when the drum is moved to one of the driving positions. The contact surface 117 may be coated or treated to improve the transmission of force from the driving cones to the drums, if desired.

The manner in which the carriages are supported on the frame is described with reference to FIG. 5. Because of the nature of the variable speed friction drive unit of the present invention, it is necessary that each carriage 36, 38 be free to pivot relative to the frame 26 about an axis extending in a direction generally parallel to and spaced from the rotational axis of the drum supported on the carriage, and transverse to the axis of the drive shaft. However, the carriages must also be allowed to twist or rotate slightly about an axis parallel to the side arms 82, 84 of the carriage in order to vary the point of contact between the drum and the drive cones. By allowing such twisting of the carriages, it is possible to change the rotational speed of the drums, and thus control the speed of the lawn mower.

The support means used to obtain this flexible type of support of the carriages is the same for each carriage, wherein each support means is independent of the other in order to permit distinct operation of each carriage. Each support means includes a single universal joint provided between the bore 70 in the frame and the tap 92 in the associated carriage. Thus, the universal joints connect the rear outboard corners of the carriages 36, 38 to the frame for universal pivotal movement about the joints. As shown in FIG. 6, the joint on the carriage 38 includes a threaded pivot bolt 112 having a spherical, ball-shaped end, and an insert 114, e.g. formed of a wear resistant material, which is fitted within the tap 92 of the carriage and receives the end of the bolt 112 for universal pivotal movement. The joint on the carriage 36 is identical to the joint on the carriage 38.

Each pivot bolt 112 is secured to the frame by a nut 116 that is tightened up against the inside surface of the cutout area 64 once the bolts are properly positioned during assembly. A rigid flat strip of metal 118 is sandwiched between a head of each bolt and the frame, and includes a hole in which one of the coil tension springs 96 is hooked. As shown in FIG. 5, the springs 96 are connected between the metal strips 118 and the lugs 94 of the carriages 36, 38, and define a biasing means for biasing the carriages in opposing directions transverse to the axis of the drive shaft away from the center of the beams 56, 58.

As shown in FIG. 9, the support means for each carriage also includes a first biasing assembly 122 for biasing the rear end of the carriage toward the neutral position, and a second biasing assembly 124 for biasing the front end of the carriage toward the neutral position. The first biasing assembly 122 associated with each carriage is illustrated in FIG. 10, and extends between the base 74 of the frame and the respective carriage 36, 38.

The first biasing assembly of each support means includes a pair of compression springs or resilient plugs 126, 128 between which the fingers 98 of the carriage are sandwiched, and a mounting means for supporting and positioning the plugs relative to the frame. The illustrated plugs 126, 128 are annular in shape, and are formed of a material such as rubber that may be compressed by the carriage so that the carriage may be moved against the compressive force of the plugs by the drive engaging means.

Figure 10:
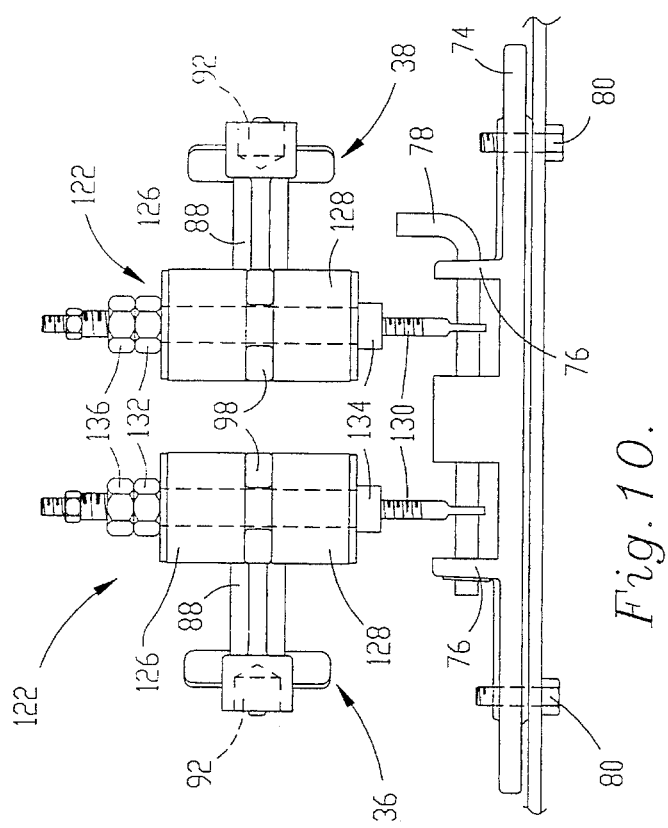
FIG. 10 is a fragmentary rear elevational view of the frame and carriages, illustrating various aspects of the support means for the carriages.

As shown in FIG. 10, the plugs 126, 128 are mounted on the base 74 by an elongated threaded rod 130 provided at the lower end with an eye through which the L-shaped pin 78 extends. The pin 78 also extends through openings in the lugs 76 of the base, and holds the plugs 126, 128 relative to the frame during movement of the carriage. A spring mount 134 is interposed between the plugs 126, 128 and the pin 78, and includes a threaded inner surface which permits the mount to be translated along the pin 78 by relative rotation. The spring mount 134 includes a shoulder at the lower end thereof, on which a washer rests. The washer and shoulder support the plugs 126, 128 on the mount so that when the position of the mount is adjusted, both plugs move together. A further washer is provided on top of the upper plug 126, and the outer surface of the mount is threaded to receive nuts 132, 136.

The nuts 132, 136 are threaded onto the spring mount above the plugs 126, 128, and these nuts limit movement of the plugs away from one another. A lock nut 139 is also provided to secure the spring mount in a desired position. The fingers 98 of the associated carriage are sized for receipt around the spring mount and between the plugs so that the fingers are sandwiched between the plugs and retained thereby. Thus, the rear end of each carriage is positioned relative to the frame by both the universal joint at the outboard corner, and by the first biasing assembly at the inboard corner.

The positions of the plugs 126, 128 of each of the first biasing assemblies may be adjusted to alter the point of initial contact between the drum and cones when the carriage is moved to the drive positions. By allowing this adjustment, the ratio between the rotational speed of the cones and the rotational speed of the drum may be adjusted. In order to vary the point of initial contact between the drum and cones, the spring mount is moved up or down on the pin 78 so that the plugs 126, 128 are moved together to a higher or lower position. In this manner the position of the carriages is altered.

In order to vary the output torque of the unit, the plugs 126, 128 are moved either closer together or further apart so that they exert a greater or lesser biasing force on the fingers 98 toward the neutral position. For example, if the plugs are moved closer together, they exert a greater biasing force on the first ends of the carriages 36, 38, and the carriage twists less during movement of the hand levers than if a lesser biasing force were exerted. Thus, the output torque would be increased.

Because both carriages are provided with this type of support at the rear end thereof, it is possible to match the operation of each carriage to the other, thus providing the same feel to the operator. In other words, by properly adjusting the support means of each carriage, drive is transmitted to either rear wheel of the lawn mower with equal torque as the drive engaging means for the two carriages are moved together. This simplifies steering control of the lawn mower.

The second biasing assembly 124 of the support means for the carriage 36 is shown in FIG. 9, and includes a pair of compression coil springs 138, 140 between which the outboard lug 90 on the front end of the carriage is sandwiched, and a mounting means for supporting and positioning the springs relative to the frame. The mounting means includes a bolt 142 secured to the frame and passing up through the opening in the lug 90. The springs 138, 140 surround the bolt, and are retained on it by a pair of nuts 144, 146 located above the upper spring and below the lower spring. The nuts 144, 146 are adjustable along the bolt to adjust the biasing force exerted on the carriage by the springs, and thus the second assembly maintains the neutral position of the carriage 36. The second biasing assembly associated with the carriage 38 is the same as the assembly 124 associated with the carriage 36.

Figure 11:
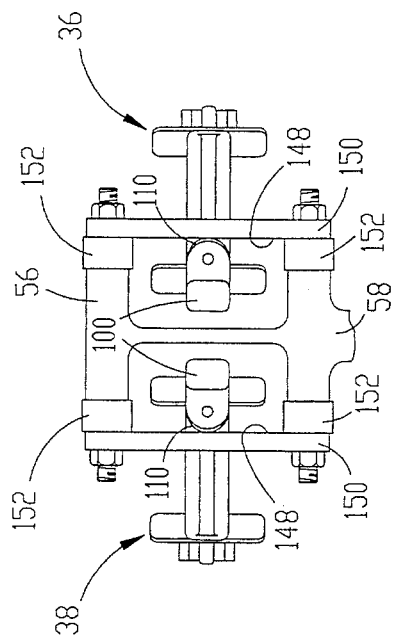
FIG. 11 is a fragmentary front elevational view of the frame and carriages, illustrating various aspects of a lateral support means for the carriages.

As shown in FIG. 11, the support means for each carriage also includes a lateral positioning means for maintaining the lateral position of the associated carriage relative to the frame during movement of the carriage. Each lateral positioning means includes a bearing surface 148 defined in a vertical plane parallel to the longitudinal axis of the associated carriage, and the roller 110 supported on the extension 100 of the carriage.

The bearing surface is preferably defined by a vertical guide bar 150 that is attached between the upper and lower beams 56, 58 of the frame, and the bearing surface 148 faces inward of the bar and opposes the roller 110. As mentioned above, the springs 96, as shown in FIG. 5, bias the carriages outward away from one another, forcing the rollers 110 against the surfaces 148. Preferably, spacers 152 are retained between each bar 150 and the frame at both ends of the bar, and position the bars outboard of the column by a distance sufficient to receive the extensions. These spacers are formed of a compressible material such as rubber, and dampen the transmission of any vibration to the drive engaging means.

Turning to FIG. 3, the drive engaging means associated with each carriage is illustrated as including an input member 154, a force transmitting member 156 connected between the input member and the front end of the associated carriage for moving the carriage between the neutral and driving positions when the input member is rotated, and one of the hand levers 22 for rotating the input member.

The input member 154 is preferably a shaft or tube that is supported for rotation about its own central longitudinal axis which extends in a direction parallel to the axes on which the drums 32, 34 are supported. The input member includes an inboard lug 158 for supporting the force transmitting member, and an outboard lug 160 for supporting the hand lever 22.

The force transmitting member 156 is a rigid element connected between the inboard lug 158 of the input member and the extension 100 of the associated carriage, and preferably includes a pair of threaded eye elements that are received in a double threaded sleeve such that when the sleeve is rotated relative to the eyes, they are either moved toward or away from one another. Each of the eyes are, in turn, attached to the lug or extension by a bolt and nut assembly.

The lever 22 of each drive engaging means includes a lower tube 162 having a handle bar connected to the front end opposite the input member. The tube 162 is hollow, and a bolt and nut assembly is used to secure the tube onto the outboard lug 160 of the input member for rotational movement about the axis of the tube 162. Thus, the handle bar may be pivoted from a raised position, as shown in FIG. 3, wherein fore and aft movement of the bars rotate the input members to lift or lower the carriages, and a lowered position disposed to the sides of the seat, wherein the operator is free to step from the lawn mower.

As illustrated in FIG. 9, during operation, the first and second biasing assemblies 122, 124 maintain the carriages in the neutral positions so that the drums are spaced from the drive cones 28, 30 and no drive is transmitted to the rear wheels of the lawn mower. With reference to FIG. 3, if the operator wishes to move forward, the hand levers 22 are moved forward together, causing the input members 154 to exert a downward force on the carriage 36 and a lifting force on the carriage 38. This difference in the direction in which the input force acts is obtained by locating the lug of the far input member on the rear side thereof, and the lug of the near member on the front side.

As shown in FIG. 2, the downward force on the near carriage 36 brings the drum 32 into contact with the upper drive cone 30 so that rotation is transmitted to the associated rear wheel of the lawn mower. The upward force on the far carriage brings the associated drum 34 into contact with the lower drive cone 28 so that rotation is transmitted to the other rear wheel of the lawn mower in the same direction as the first wheel. Reverse driving movement of the lawn mower is achieved by pulling the hand levers 22 toward the operator so that the drums, and thus the wheels, are rotated in an opposite direction.

In order to turn the lawn mower, one of the hand levers is moved forward by a distance greater than the other hand lever so that one of the rear wheels is driven at a speed different than the speed of the other wheel.

After each actuation of the hand levers, the first and second biasing assemblies 122, 124 force the carriages back to the established neutral position so that the lawn mower will not transmit driving power to the wheels without a positive input force by the operator. As shown in FIG. 11, during movement of the carriages, the lateral positioning means allows the carriages to twist as necessary about the axis of the bearing roller 110 so that as more force is exerted on the handles, the carriages twist to bring the drum into contact with the cone at a point closer to the drum axis. As a result, the speed of the drum increases as does the speed of the lawn mower. During such twisting of the carriages, the rollers 110 bear against the vertical bar 150 to limit outward movement of the front end of the carriage, maintaining the desired relationship between the drum and the drive cones.

Although the invention has been described with reference to the preferred embodiment illustrated in the attached drawing figures, it is noted that substitutions may be made and equivalents employed herein without departing from the scope of the invention as recited in the claims.

What is claimed is:

1. A variable speed friction drive apparatus comprising:
   a frame;
   a pair of drive cones supported by the frame for rotation about a common first axis;
   a carriage extending in a direction generally transverse to the first axis and including opposed first and second axial ends;
   a drum supported by the carriage for rotation about a second axis extending in a direction transverse to the length of the carriage;
   a carriage support means for supporting the carriage relative to the frame for movement between a neutral position in which the drum is disengaged from either of the cones and a plurality of driving positions in which the drum engages either of the cones,
   the support means including a universal joint for connecting the first end of the carriage to the frame for universal pivotal movement about the joint, a first biasing means for biasing the first end of the carriage toward the neutral position, and a second biasing means for biasing the second end of the carriage toward the neutral position; and
   a drive engaging means connected to the second end of the carriage for moving the carriage against the forces exerted by the first and second biasing means between the neutral and driving positions.

2. A drive apparatus as recited in claim 1, wherein the first biasing means includes a pair of compression springs between which the carriage is sandwiched, and a mounting means for supporting and positioning the springs relative to the frame, the springs being formed of a material that permits the springs to be compressed by the carriage so that the carriage may be moved against the compressive force of the springs by the drive engaging means.

3. A drive apparatus as recited in claim 2, wherein the position of each spring of the first biasing means relative to the frame may be adjusted to alter the point of initial contact between the drum and cones when the carriage is moved to the drive positions, the speed ratio between the rotational speed of the cones and the rotational speed of the drum being dependent upon the position of the point of contact between the cones and drum relative to the first and second axes.

4. A drive apparatus as recited in claim 3, wherein each spring is formed of an annular piece of compressible material, the mounting means including a rod on which the springs are received, and nuts for preventing the springs from moving from the adjusted positions on the rod when the carriage is sandwiched between the springs.

5. A drive apparatus as recited in claim 4, wherein the carriage includes a pair of fingers extending longitudinally from the first end of the carriage, the fingers being sized for receipt around the rod and between the springs.

6. A drive apparatus as recited in claim 1, wherein the universal joint includes a bolt that is supported between the frame and the first end of the carriage by an insert formed of a wear resistant material which permits a limited range of universal movement between the carriage and frame.

7. A drive apparatus as recited in claim 1, wherein the second biasing means includes a pair of compression coil springs between which the carriage is sandwiched, and a mounting means for supporting and positioning the springs relative to the frame.

8. A drive apparatus as recited in claim 1, wherein the carriage is generally rectangular, presenting two spaced corners at each of the ends, the universal joint being connected to one corner of the first end, the first biasing means engaging the other corner of the first end, the second biasing means engaging one corner of the second end, and the drive engaging means operating through the other corner of the second end.

9. A drive apparatus as recited in claim 1, wherein two carriages, drums, and carriage support means are provided, the carriages being generally parallel to one another and positioned on opposite sides of the first axis.

10. A drive apparatus as recited in claim 1, further comprising a lateral positioning means for maintaining the lateral position of the carriage relative to the frame during movement of the carriage, the lateral positioning means including a bearing surface defined in a plane parallel to the first axis, and a biasing means for biasing the carriage against the bearing surface in a direction transverse to the first axis away from the cones.

11. A drive apparatus as recited in claim 1, wherein the drive engaging means includes an input member supported relative to the carriage for rotation about an axis parallel to the second axis, a force transmitting member connected between the input member and the second end of the carriage for moving the carriage between the neutral and driving positions when the input member is rotated, and a hand lever for rotating the input member.

12. A drive apparatus as recited in claim 1, wherein the frame is formed of a unitary piece of material including an upright wall and a pair of spaced elongated beams extending outward from the wall, the elongated beams being formed with cone support means for supporting the drive cones and defining the location of the first axis relative to the frame, and the rear wall is formed with a connection point for receiving and supporting the universal joint, the cone support means and universal joint being spaced from one another by a distance which is fixed during formation of the unitary frame.

13. A variable speed friction drive apparatus comprising:

a frame;

a pair of drive cones supported by the frame for rotation about a common first axis;

a carriage extending in a direction generally transverse to the first axis and including opposed first and second axial ends;

a drum supported by the carriage for rotation about a second axis extending in a direction transverse to the length of the carriage;

a carriage support means for supporting the carriage relative to the frame for movement between a neutral position in which the drum is disengaged from either of the cones and a plurality of driving positions in which the drum engages either of the cones, the support means including a universal joint for connecting the first end of the carriage to the frame for universal pivotal movement about the joint, and a first biasing means for biasing the carriage toward the neutral position;

a drive engaging means connected to the second end of the carriage for moving the carriage relative to the frame between the neutral and driving positions; and a lateral positioning means for maintaining the lateral position of the carriage relative to the frame during movement of the carriage, the lateral positioning means including a bearing surface defined in a plane parallel to the first axis, and a second biasing means for biasing the carriage against the bearing surface in a direction transverse to the first axis away from the cones.

14. A drive apparatus as recited in claim 13, wherein the second biasing means is a spring positioned between the frame and carriage for forcing the carriage toward the bearing surface.

15. A drive apparatus as recited in claim 13, further comprising a roller supported on the carriage for rotation about a third axis extending in a direction parallel to the bearing surface and transverse to the first and second axes.

16. A drive apparatus as recited in claim 13, wherein the bearing surface is defined by a plate that is secured to and removable from the frame.

17. A variable speed friction drive apparatus comprising:

a frame;

a pair of drive cones supported by the frame for rotation about a common axis;

a carriage extending in a direction generally transverse to the first axis and including opposed first and second axial ends;

a drum supported by the carriage for rotation about an axis extending in a direction transverse to the length of the carriage;

a universal joint for connecting the carriage to the frame for universal pivotal movement about the joint, the carriage being movable relative to the frame between a neutral position in which the drum is disengaged from either of the cones and a plurality of driving positions in which the drum engages either of the cones; and a drive engaging means connected to the second end of the carriage for moving the carriage relative to the frame between the neutral and driving positions, the drive engaging means including an input member Supported relative to the carriage for rotation about an axis parallel to the axis Of the drum, a force transmitting member connected between the input member and the second end of the carriage for moving the carriage between the neutral and driving positions when the input member is rotated, and a hand lever for rotating the input member, wherein the hand lever is supported on the input member for relative pivotal movement about an axis transverse to the axis of rotation of the input member between an operative position and an inoperative position.

* * * * *